US006946160B2

(12) United States Patent
Nakao

(10) Patent No.: US 6,946,160 B2
(45) Date of Patent: Sep. 20, 2005

(54) METHOD OF FORMING FLUORESCENT SCREEN

(75) Inventor: Norihisa Nakao, Honjo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 110 days.

(21) Appl. No.: 10/101,951

(22) Filed: Mar. 21, 2002

(65) Prior Publication Data

US 2002/0176932 A1 Nov. 28, 2002

(30) Foreign Application Priority Data

Mar. 23, 2001 (JP) ....................................... 2001-086225

(51) Int. Cl.[7] ............................ G02B 5/22; B05D 3/02; B05D 5/06

(52) U.S. Cl. ........................... 427/157; 427/64; 427/68; 427/72; 427/164; 427/240; 427/372.2; 427/377; 427/378; 313/461; 313/473; 313/474; 359/885

(58) Field of Search .............................. 427/64, 68, 72, 427/157, 162, 164, 165, 240, 425, 256, 271, 272, 282, 287, 372.2, 377, 378, 379; 359/885; 313/461, 463, 473, 474

(56) References Cited

U.S. PATENT DOCUMENTS 5,686,787 A * 11/1997 Itou et al. ................... 313/461
5,939,821 A * 8/1999 Itou et al. ................... 313/461
5,955,226 A * 9/1999 Matsuda et al. .............. 430/25

FOREIGN PATENT DOCUMENTS

JP 10-55760 2/1998
JP 10-055760 A * 2/1998
JP 10-199419 A * 7/1998
JP 11-242106 A * 9/1999
JP 11-354026 12/1999

OTHER PUBLICATIONS

Abstract of reference or above.

* cited by examiner

*Primary Examiner*—Timothy Meeks
*Assistant Examiner*—Wesley D. Markham
(74) *Attorney, Agent, or Firm*—Pillsbury Winthrop Shaw Pittman, LLP

(57) ABSTRACT

A method of forming a fluorescent screen where a pigment film and a fluorescent film are deposited on a surface of a light transmissive substrate, is presented. The method includes coating a pigment dispersion liquid on the surface of the light transmissive substrate to form a coated film and forming the pigment film by drying the coated film. The drying of the coated film is performed under conditions that a temperature of the corner portions of the light transmissive substrate is controlled to 36° C. to 50° C.

13 Claims, 2 Drawing Sheets

METHOD OF FORMING FLUORESCENT SCREEN

CROSS-REFERENCE TO RELATED APPLICATIONS

This application is based upon and claims the benefit of priority from the prior Japanese Patent Application No. 2001-086225, filed on Mar. 23, 2001, the entire contents of which are incorporated herein by reference.

BACKGROUND OF THE INVENTION

1. Field of the Invention

The present invention relates to a method of forming a fluorescent screen, in particular to a method of forming a color filter to be formed on the inner surface of the panel of a color cathode-ray tube.

2. Description of the Related Art

In the conventional color cathode-ray tube, there is known a fluorescent screen in which a filter pattern is interposed between the inner surface of the panel of the face plate (face panel) and a fluorescent layer, wherein the filter pattern is constituted by a pigment layer which is capable of transmitting therethrough a light of the same color as the luminescent color of a fluorescent substance. This fluorescent screen is constructed such that a light of green or blue component among the incident external light is enabled to be absorbed by a red pigment layer, a light of green or red component among the incident external light is enabled to be absorbed by a blue pigment layer, and a light of blue or red component among the incident external light is enabled to be absorbed by a green pigment layer, thereby making it possible to improve the image characteristics such as contrast, color purity, etc.

As for the method of forming such a filter pattern, there has been employed a method, as set forth in Jpn. Pat. Appln. KOKAI Publication No. 11-354026, wherein a pigment-dispersed solution is coated on the inner surface of panel to form a pigment layer thereon, after which a photoresist is coated on the pigment layer. Thereafter, the resultant photoresist layer is subjected to a patterning process comprising exposure and development steps. On this occasion, predetermined regions of the filter layer which are required to be left remain for forming a pattern are required to be excellent in adhesivity to the glass panel, and all of the regions other than the aforementioned predetermined regions are required to be excellent in releasability from the glass panel. Further, the pigment layer should be constructed such that it is excellent in transparency and pigment particles are uniformly dispersed all over the layer without being flocculated.

This method of forming a filter pattern described above however is accompanied with a problem, on the occasion of drying a coated film which has been formed through the coating of a pigment dispersion liquid on the inner surface of the glass panel, that a difference in drying speed is generated between a central region and a corner region of the effective display area of the face panel. As a result, a dried region and an undried region are generated in the middle of the drying step, thereby raising a problem that a rib-like thickened portion is generated at the boundary between the dried region and the undried region.

Namely, since the viscosity of the pigment dispersed liquid is generally as low as 2 cp, when the pigment dispersion liquid is coated on the inner surface of the face panel by means of a rotational coating method, differences in film thickness are generated among a central region, an intermediate region and a peripheral region of the face panel, i.e. the film thickness is increased in the mentioned order. At the peripheral region in particular, i.e. at four corner portions of a rectangular panel, a long and slender thickened region is generated along the rotational direction.

When a coated film having such a non-uniform thickness is dried, a difference in drying speed is generated in accordance with the differences in film thickness, so that dried portions in the central and intermediate regions are caused to co-exist with the undried portion in the peripheral region, in particular, corner regions in the middle of the drying step, thereby permitting a rib-like thickened portion to be generated at the boundary between the dried portion and the undried portion.

If there is such a rib-like thickened portion on the panel face, the portion of resist which is formed over this rib-like thickened portion becomes thinner, so that the ability of the resist to retain the pigment film would be deteriorated. As a result, there will be generated a phenomenon of so-called dot flaws where even a portion of a pigment film which is covered by a resist is removed on the occasion of removing a portion of the pigment layer which is not covered by the resist. A color cathode-ray tube having such dot flaws in the color filter thereof is deemed as being defective.

This problem is not confined to the aforementioned pigment film, but will be also encountered in forming a black film to be employed for forming a black matrix.

In the case where a film is excellent in light transmission, the uniformity of the film can be determined from a transmitted light. Namely, since the light transmittance of a film varies depending on the thickness of the film, the uniformity of the transmitted light depends largely on the uniformity of film thickness such as the irregularity of film thickness. In the case where a film is poor in light transmission, the uniformity of the film can be determined from the reflected light. Since the uniformity of the reflected light is hardly affected by the magnitude of film thickness, the non-uniformity of film thickness can be substantially disregarded.

In the case where a fluorescent screen is provided with a light transmissive color filter as mentioned above, the non-uniformity of film thickness gives much influence to the brightness as well as to the uniformity of the external appearance of the display device such as a CRT. Further, if the film thickness varies greatly, it will give rise to the generation of the aforementioned problem of dot flaws. Therefore, it is important to control the uniformity of the film thickness, and the reason for necessitating this control can be attributed to the drying speed of the film. As explained above, the control of this drying speed becomes very important especially in the case where the film to be controlled is a color filter excellent in light transmission.

BRIEF SUMMARY OF THE INVENTION

An object of the present invention is to provide a method of forming a fluorescent screen, which is capable of preventing the generation of differences in drying speed of a pigment film on the occasion of forming the fluorescent screen, thereby making it possible to obtain a fluorescent screen which is free from dot flaws in the pigment film and hence excellent in quality.

According to the present invention, there is provided a method of forming a fluorescent screen where a pigment film and a fluorescent film are deposited on a surface of a light transmissive substrate, the method comprising: coating a pigment dispersion liquid on the surface of the light transmissive substrate to form a coated film; and forming a pigment film by drying the coated film; wherein the step of drying the coated film is performed under the conditions that a temperature of corner portions of the light transmissive substrate is controlled to not lower than 36° C., and at the same time, a difference in temperature between the temperature of a central region and the temperature of the corner portions of the light transmissive substrate is confined to within 7° C.

According to the present invention, there is also provided a method of forming a fluorescent screen where a pigment film and a fluorescent film are deposited on a surface of a light transmissive substrate, the method comprising the steps of: coating a pigment dispersion liquid on the surface of the light transmissive substrate to form a coated film; and forming a pigment film by drying the coated film; wherein the step of drying the coated film is performed such that corner portions of the coated film is allowed to dry by drying means which is exclusively assigned to dry the corner portions of the coated film in addition to separate drying means which is assigned to dry entire surface of the coated film, and at the same time, a film thickness of the pigment film is controlled to 0.3 μm or more.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1A:
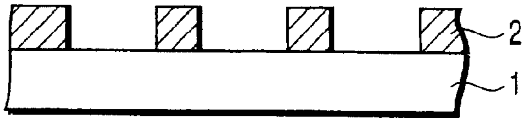
FIGS. 1A to 1G respectively show a cross-sectional view illustrating, in order of steps, the process of forming a fluorescent screen according to one example of the present invention.

According to the first embodiment of the present invention, the step of drying the coated film is performed under the conditions that a temperature of the corner portions of said light transmissive substrate is controlled to not lower than 36° C., and at the same time, the difference in temperature between the temperature of a central region and the temperature of the corner portions of said light transmissive substrate is confined to within 7° C.

It is preferable in the method of forming a fluorescent screen according to the first embodiment of the present invention that the film thickness of the pigment film is controlled to 0.3 μm or more in the drying step. It is also preferable in the method of forming a fluorescent screen according to the first embodiment of the present invention that the temperature of corner portions of the light transmissive substrate is controlled to the range of 36° C. to 50° C.

According to the second embodiment of the present invention, the step of drying the coated film is performed such that the corner portions of the coated film are allowed to dry by drying means which is exclusively assigned to dry the corner portions of the coated film in addition to separate drying means which is assigned to dry the entire surface of the coated film, and at the same time, the film thickness of said pigment film is controlled to 0.3 μm or more.

In the method of forming a fluorescent screen according to the second embodiment of the present invention, the drying means which is exclusively assigned to dry the corner portions of the coated film may be an air-blowing means.

It is preferable in these first and second embodiments of the present invention that an average particle diameter of the pigment in said pigment dispersion liquid is confined to 0.2 μm or less, more preferably within the range of 0.01 μm to 0.2 μm. It is also preferable in these first and second embodiments of the present invention that the pigment dispersion liquid is a color filter which permits light of the same color as the luminescent color of the fluorescent film to pass therethrough.

Preferably, the fluorescent screen is one which is designed to be formed on an inner surface of the panel of a color cathode-ray tube. It is also preferable that the coating of the pigment dispersion liquid on a surface of said light transmissive substrate is performed by means of a rotational coating method.

Next, the method of forming a fluorescent screen according to the present invention will be further explained with reference to one example where the method is applied to the color filter-attached fluorescent screen of a color cathode-ray tube.

As for the pigment which is useful in the method of the present invention, it may be either an inorganic pigment or an organic pigment. It is especially preferable to employ pigments which can be dispersed uniformly in a filter layer, which do not bring about scattering of light, and which make it possible to provide the filter layer with a sufficient transparency. Since the manufacture of a color cathode-ray tube involves high-temperature processing, the employment of inorganic pigments is more preferable.

The following are specific examples of such pigments.

As for red pigments, it is possible to employ a ferric oxide-based pigment such as CYCOTRANS RED L-2817 (tradename, BASF Co., Ltd., particle diameter: 0.01–0.02 μm) or anthraquinone-based pigment such as CHROMOFASTER RED A2B (tradename, Ciba-Geigy Co., Ltd., particle diameter: 0.01 μm).

As for blue pigments, it is possible to employ a cobalt aluminate-based pigment such as COBALT BLUE X (tradename, Toyo Pigments Co., Ltd., particle diameter: 0.01–0.02 μm), ultramarine blue-based pigment such as ULTRAMARINE BLUE No. 8000 (tradename, Dai-ichi Kasei Co., Ltd., particle diameter: 0.03 μm), or phthalocyanine blue-based pigment such as LYONOL BLUE FG-7370 (tradename, Toyo Ink Co., Ltd., particle diameter: 0.01 μm).

As for green pigments, it is possible to employ a $TiO_2$—NiO—CoO—ZnO-based pigment such as DYEPYROXIDE TM-GREEN #3320 (tradename, Dainichi Seika Co., Ltd., particle diameter: 0.01–0.02 μm), a CoO—$Al_2O_3$—$Cr_2O_3$-based pigment such as DYEPYROXDE TM-GREEN #3420 (tradename, Dainichi Seika Co., Ltd., particle diameter: 0.01–0.02 μm), $Cr_2O_3$-based pigment such as ND-801 (tradename, Nippon Denko Co., Ltd., particle diameter: 0.35 μm), chlorinated phthalocyanine green-based pigment such as FASTGEN GREEN S (tradename, Dainihon Ink Co., Ltd., particle diameter: 0.01 μm), or brominated phthalocyanine green-based pigment such as FASTGEN GREEN 2YK (tradename, Dainihon Ink Co., Ltd., particle diameter: 0.01 μm).

By the way, the average particle diameter of the pigments exemplified above should preferably be not larger than 0.2 μm, more preferably in the range of 0.01–0.02 μm, most preferably in the range of 0.01–0.05 μm. If the average particle diameter of the pigments is larger than 0.2 μm, the dispersibility of pigment would be deteriorated, thereby deteriorating the transparency of the resultant color filter.

In the method according to embodiments of the present invention, a filter pattern composed of any one of these pigments can be formed by the following procedures for instance.

First of all, by means of a spin-coating method, a pigment dispersion liquid mainly comprising any one of the aforementioned pigments and a polyelectrolyte dispersion agent is coated on the inner surface of face panel which is provided in advance with a black matrix or a black stripe. It is possible, according to this spin-coating method, to obtain a layer having a uniform predetermined thickness.

Then, the pigment film coated in this manner is allowed to dry. As for the drying method, there is not any particular limitation as long as it is capable of evaporating water and dissociating a portion of the salt of the polyelectrolyte. Thus, it is possible to employ various methods such as a drying method using a heater, a drying method utilizing hot air, a drying method wherein the coated film is allowed to stand at room temperature for a long time.

As described above, there is a possibility of raising the problem in the drying process of the coated pigment film that a difference in drying speed is generated between the central region and corner regions in the inner surface of face panel, i.e. the drying speed at the central region is relatively rapid, but the drying speed at the corner regions is relatively slow. With a view of preventing such a problem, there are proposed, according to the embodiments of the present invention, the following two kinds of countermeasures.

1. The temperature of the corner portions of the face panel is controlled to be not lower than 36° C., more preferably within the range of 36 to 50° C., and at the same time, the difference in temperature between the temperature of a central region and the temperature of the corner portions of the light transmissive substrate is confined to within 7° C.

2. A drying means which is exclusively assigned to dry the corner portions of the face panel is disposed.

As for this exclusive drying means, heater drying (drying using a heater) or air-blowing for instance can be utilized.

Thereafter, a photoresist is coated on the surface of the pigment layer formed as described above and then, allowed to dry. As for the photoresist to be employed in this case, it is possible to employ ammonium dichromate (ADC), polyvinyl alcohol (PVA), sodium dichromate (SDC), diazonium salt/PVA, etc.

Then, the resultant resist coat film is subjected to exposure by making use of a high-pressure mercury arc lamp to thereby cure the irradiated (ultraviolet ray-irradiated) regions of the resist coat film, which is followed by a development process using an aqueous alkaline solution containing a substance which is capable of solubilizing the polyelectrolyte which has been made insoluble to water. On this occasion, the portions of the pigment coat film which are located underneath the regions of the resist coat film that have been removed are concurrently removed, thereby obtaining a predetermined laminated pattern consisting of the pigment layer and the resist layer.

Further, a sequence of these steps are repeated with respect to each of the colors, generally in order of blue, green and red, thereby forming a predetermined pattern consisting of three filter layers, i.e. a blue layer, a green layer and a red layer. Then, the resist layer is removed, and a blue fluorescent layer, a green fluorescent layer and a red fluorescent layer are successively deposited on the surface of the filter pattern by means of an ordinary slurry process, thus obtaining a filter-attached fluorescent screen of a color cathode-ray tube, etc.

According to the embodiments of the present invention, on the occasion of drying the pigment film that has been adhered to the inner surface of the face panel, the temperature of the corner portions of the face panel is controlled to not lower than 36° C., more preferably within the range of 36 to 50° C., and at the same time, the difference in temperature between the temperature of a central region and the temperature of the corner portions of the light transmissive substrate is confined to at most 7° C. Further, as an alternative method, a drying means which is exclusively assigned to dry the corner portions of the face panel is disposed on the occasion of drying the pigment film.

Namely, according to the method of the present invention, the temperature of the corner regions of the face panel (about 33° C. in the conventional method) is raised so as to minimize any difference in drying speed between the central region and corner regions of the face panel, thereby making it possible to prevent the generation of a rib-like thickened portion in the pigment film. As a result, the generation of aforementioned dot flaws in the pigment film can be prevented.

If the temperature of the corner portions of the face panel is lower than the temperature of a central region of the face panel to such an extent that the difference thereof is over 70° C., the drying of the pigment film at the corner regions would become insufficient, so that the dot flaws or rib-like portion would be generated irrespective of the film thickness of the pigment film, thereby making it impossible to obtain a non-defective product. On the contrary, if the temperature of the corner portions of the face panel is higher than the temperature of a central region of the face panel to such an extent that the difference thereof is over 7° C., the drying speed of the pigment film at the corner regions would become too fast, so that an irregularly thickened portion in the shape of a frame, or non-uniformity in thickness of the pigment film within the region of the black matrix or black stripe would be generated, thereby deteriorating the uniformity in brightness or external appearance of the face panel, thus making it impossible to obtain a non-defective product.

When a drying means which is exclusively assigned to dry the corner portions of the face panel is disposed on the occasion of drying the pigment film, it becomes possible to perform the uniform drying of the pigment coat film without necessitating to raise the drying temperature. As a result, it is now possible to prevent the generation of rib-like thickened portion or dot flaws of the pigment film.

By the way, the film thickness of the pigment film after finishing the drying process thereof should preferably be 0.3 μm or more. If the film thickness of the dried pigment film is less than 0.3 μm, it would become difficult to expect a sufficient function of the pigment film as a color filter. However, if the film thickness of the dried pigment film is too large, the resist to be formed over the dried pigment film would become insufficient in thickness, resulting in an decrease in the capability thereof to retain the pigment film, thus giving rise to the generation of the dot flaws. Therefore, the film thickness of the dried pigment film should preferably be not over 5 μm.

The thickness of the pigment film may differ more or less depending on the color. For instance, the thickness of red pigment film should preferably be within the range of 0.3–0.8 μm, the thickness of green pigment film should preferably be within the range of 0.6–1.0 μm, and the thickness of blue pigment film should preferably be within the range of 1.4–2.6 μm.

Next, the specific examples of the embodiments of the present invention will be explained with reference to drawings.

FIGS. 1A to 1G respectively shows a cross-sectional view illustrating, in order of steps, the process of forming a fluorescent screen according to one example of the present invention.

EXAMPLE 1

First of all, as shown in FIG. 1A, a photoabsorption layer 2 having a predetermined pattern was formed as a black matrix on the inner surface of the glass panel (six pieces in total) for a color cathode-ray tube by following the known procedures. More specifically, a photoresist layer was formed on the inner surface of the glass panel and then, subjected to an exposure process through a shadow mask. Then, the photoresist layer was subjected to developing and drying processed, thereby allowing a dotted photo-cured film to remain at predetermined regions for forming a pigment layer and a fluorescent layer. Then, a photoabsorptive substance such as graphite is coated all over the surface, and the resultant surface was washed using an aqueous solution of hydrogen peroxide to thereby dissolve the photo-cured film together with the photoabsorptive substance which was deposited on the photo-cured film, thus forming a patterned photoabsorption layer 2 where the predetermined regions for forming a pigment layer and a fluorescent layer were exposed.

Then, the following compositions each designed to be employed as a pigment dispersion liquid for forming each of blue, green and red filter layers were prepared.

For the preparation of a green pigment dispersion liquid, 30% by weight of a green pigment composed of $TiO_2$—NiO—CoO—ZnO (DYEPYROXIDE TM-GREEN #3320 (tradename), Dainichi Seika Co., Ltd., particle diameter: 0.01–0.02 μm) and 0.7% by weight of a polyelectrolyte composed of ammonium salt of acrylic copolymer (DISPEC GA-40 (tradename), Allied-Colloid Co., Ltd.) were mixed each other to form a mixture, which was then dispersed in pure water to thereby obtain the green pigment dispersion liquid. In this case, the ratio of the concentration of polyelectrolyte/the concentration of pigment was 0.023.

For the preparation of a blue pigment dispersion liquid, 30% by weight of a blue pigment composed of cobalt aluminate ($Al_2O_3$—CoO) (COBALT BLUE X (tradename), Toyo Pigments Co., Ltd., particle diameter: 0.01–0.02 μm) and 0.7% by weight of a polyelectrolyte composed of ammonium salt of acrylic copolymer (DISPEC GA-40 (tradename), Allied-Colloid Co., Ltd.) were mixed each other to form a mixture, which was then dispersed in pure water to thereby obtain the blue pigment dispersion liquid. In this case, the ratio of the concentration of polyelectrolyte/the concentration of pigment was 0.023.

For the preparation of a red pigment dispersion liquid, 20% by weight of a blue pigment composed of fine particles of $Fe_2O_3$ (particle diameter: 0.01–0.02 μm) and 0.7% by weight of a polyelectrolyte composed of ammonium polyoxyethylene alkylether sulfate (HYTENOL 08 (tradename), Dai-ichi Kogyo Pharmaceutics Co., Ltd.) were mixed each other to form a mixture, which was then dispersed in pure water to thereby obtain the red pigment dispersion liquid. In this case, the ratio of the concentration of polyelectrolyte/the concentration of pigment was 0.035.

The steps of coating and drying the pigment dispersion liquid were performed according to the following methods, respectively. Namely, the panel 1 of a color cathode-ray tube, which was employed as a substrate, was kept at a temperature of 30° C., and then, the aforementioned blue pigment dispersion liquid was coated on the surface of the panel 1 by means of a spin-coating method.

The coating of the pigment dispersion liquid by means of the spin-coating method was performed in such a manner that under the condition where the coating surface of the face panel was inclined at an angle of 35 degrees relative to the horizontal plane, the pigment dispersion liquid was ejected from a nozzle, and then, the panel 1 was rotated at rotational speed of 100 to 150 rpm to thereby shake off an excessive quantity of the pigment dispersion liquid to obtain a coated layer having a predetermined thickness.

Figure 1B:
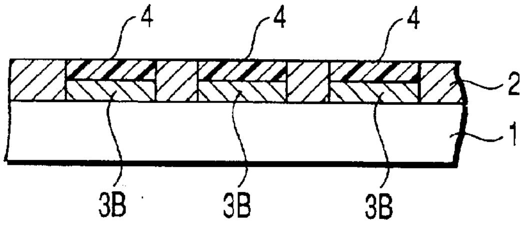

Subsequently, under the condition where the face panel was inclined at an angle of 75 degrees relative to the horizontal plane, the coated film was dried by making use of a panel-like infrared heater which was disposed to face the face panel, thereby forming a blue pigment layer 3B as shown in FIG. 1B.

On this occasion, the temperature of heater for each of six pieces of the panels was variously altered so as to control the temperature of the corner regions of these panels to 30° C., 32° C., 34° C., 36° C., 38° C. and 40° C., respectively.

Then, a photoresist solution having a composition described as follows was prepared. Namely, 3% by weight of polyvinyl alcohol (PVA), 0.2% by weight of ammonium dichromate, 0.01% by weight of a surfactant, and the balance of pure water were mixed with each other to prepare a photoresist solution, which was then coated and dried in the same manner as in the case of the aforementioned blue pigment dispersion liquid to form a resist coat film 4 on the surface of the blue pigment layer 3B as shown in FIG. 1B.

Figure 1C:
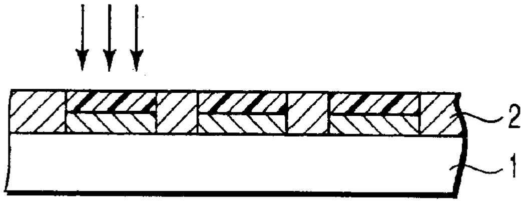
Figure 1D:
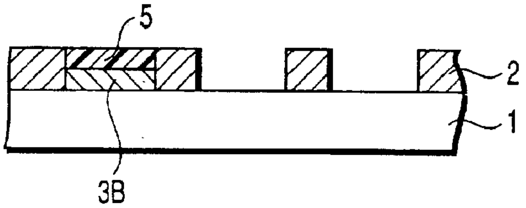

Then, as shown in FIG. 1C, the resultant resist coat film was subjected to an exposure of predetermined pattern by making use of a high-pressure mercury arc lamp. Thereafter, the developing and drying processes of the resist pattern were performed according to the following methods. Namely, a developing solution constituted, for example, by an aqueous alkaline solution (pH=9) containing $NaCO_3$ for instance was sprayed onto the resist layer at a liquid pressure of 2–10 kg/cm$^2$ to develop the resist pattern, which was followed by drying, thereby forming a predetermined pattern constituted by a laminate structure composed of the blue pigment layer 3B and the cured resist layer 5 as shown in FIG. 1D.

Figure 1E:
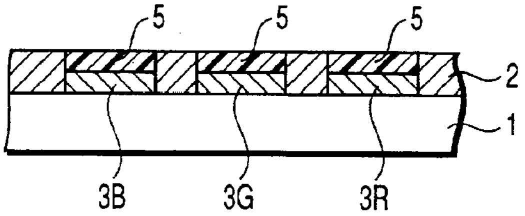
Figure 1F:
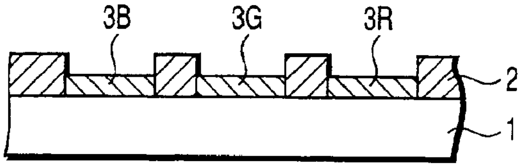

In the same manner as in the case of this blue pigment layer 3B, a green pigment layer 3G and a red pigment layer 3R were successively formed on each of six pieces of samples (FIG. 1E). Namely, on the occasion of drying the coated layer, the temperature of heater for each of six pieces of the panels was variously altered so as to control the temperature of the corner regions of these panels to 30° C., 32° C., 34° C., 36° C., 38° C. and 40° C., respectively. By the way, in the formation of the green pigment layer 3G and the red pigment layer 3R, the same aqueous alkaline solution containing $NaCO_3$ was employed as a developing solution therefor.

Next, the resist layer 5 deposited on each of the blue, green and red pigment layers was peeled away, thereby forming a filter pattern consisting of the blue pigment layer 3B, the green pigment layer 3G and the red pigment layer 3R on the inner surface of the panel 1.

Subsequently, the filter pattern formed in this manner was observed to investigate if there is any dot flaw, the results being shown in the following Table 1. Table 1 shows the case where the transmittance of the pigment layer is 80% or more.

TABLE 1

| Temp. of panel | Dot flaws |
|---|---|
| 30° C. | Generated linearly 30–40 mm in length |
| 32° C. | Several tens points |
| 34° C. | Several points |
| 36° C. | None |
| 38° C. | None |
| 40° C. | None |

As clearly seen from Table 1, when the temperature of the corner regions of the panel was 30° C., 32° C. or 34° C. on the occasion of drying the coated film of the pigment dispersion liquid, a rib-like thickened portion was recognized at the corner regions of the panel. Further, the lower the temperature of the corner portions of the panel was, the more prominently the area of the dot flaws was expanded.

Whereas, when the temperature of the corner regions of the panel was 36° C., 38° C. or 40° C., i.e. not less than 36° C., on the occasion of drying the coated film of the pigment dispersion liquid, the generation of dot flaw was not recognized at all.

Figure 1G:
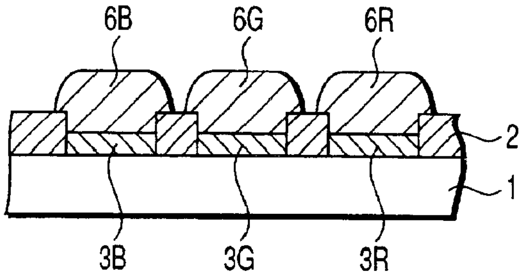

Next, as shown in FIG. 1G, by means of the ordinary slurry process, a blue fluorescent layer 6B, a green fluorescent layer 6G and a red fluorescent layer 6R were successively formed on the blue pigment layer 3B, on the green pigment layer 3G, and on the red pigment layer 3R, respectively.

By the way, as for the fluorescent slurry (suspension), the following materials were employed. Namely, as for the blue fluorescent slurry, a slurry comprising 100 g of a blue color-emitting fluorescent substance (ZnS: Ag, Al), 5 g of PVA, 0.30 g of ADC, 0.01 g of a surfactant and 140 g of pure water, which were fully mixed together, was employed. As for the green fluorescent slurry, a slurry comprising 100 g of a green color-emitting fluorescent substance (ZnS: Cu, Al), 8 g of PVA, 0.40 g of ADC, 0.01 g of a surfactant and 160 g of pure water, which were fully mixed together, was employed. As for the red fluorescent slurry, a slurry comprising 100 g of a red color-emitting fluorescent substance ($Y_2O_2S$: Eu), 10 g of PVA, 0.50 g of ADC, 0.01 g of a surfactant and 190 g of pure water, which were fully mixed together, was employed.

In this manner, it was possible to obtain a filter-attached fluorescent screen wherein blue, green and red pigment layers 3B, 3G and 3R as well as blue, green and red fluorescent layers 6B, 6G and 6R were respectively formed in a predetermined pattern on the inner surface of the panel 1. The fluorescent screen obtained in this manner was free from dot flaws in the pigment layer, thus enabling to realize a display of high-quality.

Next, investigations were performed on the quality of fluorescent screens which had been formed under the conditions where the transmittance (film thickness) of the pigment layer was changed within the range of 10 to 95% at various temperatures of the corner regions of panel (a difference in temperature between the central region and the corner region of panel being confined within ±7° C.). The results are shown in FIG. 2, wherein the quality of fluorescent screen was assessed under the criterion that when the quality grade was 8 or more, the fluorescent screen was deemed to be non-defective, while when the quality grade was 7 or less, the fluorescent screen was deemed to be defective.

Figure 2:
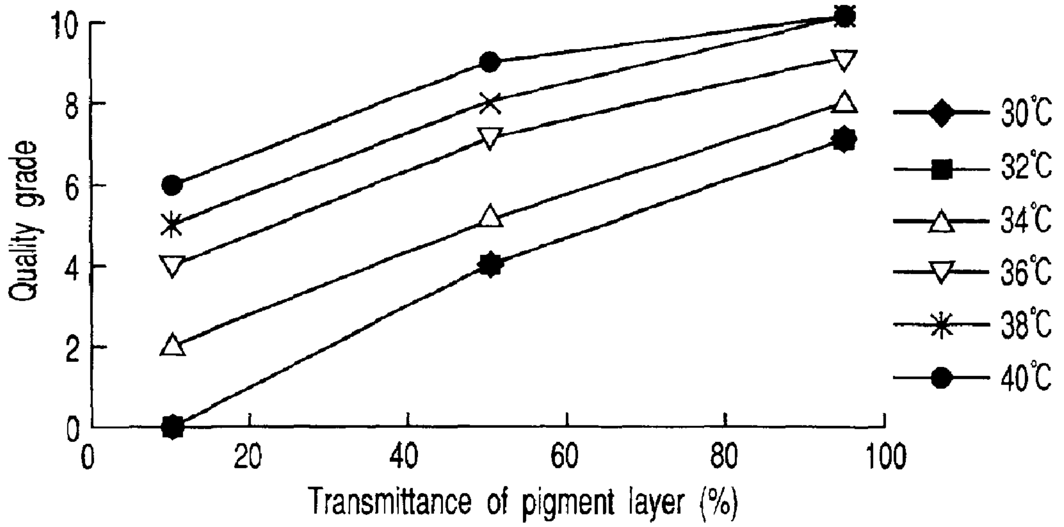
FIG. 2 is a graph illustrating the relationship between the light transmittance (film thickness) of a pigment and the quality of fluorescent screen, which were obtained at the temperature of each corner region.

It will be seen from FIG. 2 that the higher the temperature of the corner regions was, the more excellent was the quality of product, and the higher (80% or more) the transmittance of the pigment layer (the thinner the pigment layer) was, the more excellent was the quality of product.

EXAMPLE 2

Color filters were produced in the same manner as shown in Example 1 except that in addition to changing the temperature of the corner regions of panel, air was sprayed against the corner regions of panel in the step of drying the coated film of pigment dispersion liquid.

By the way, this air spray against the corner regions of panel was performed in such a manner that the air was sprayed from a nozzle against the peripheral regions of the inner surface of panel at a predetermined inclined angle so as to enable the air flow to flow toward the circumference of panel. The flow rate of the air flow was 150 mL/min. and the temperature of the air flow was 23° C.

Subsequently, the filter pattern formed in this manner was observed to investigate if there are any dot flaws, the results being shown in the following Table 2. Table 2 shows the case where the transmittance of the pigment layer is 80% or more.

TABLE 2

| Temp. of panel | Dot flaws |
|---|---|
| 30° C. | None |
| 32° C. | None |
| 34° C. | None |
| 36° C. | None |
| 38° C. | None |
| 40° C. | None |

As clearly seen from Table 2, irrespective of the temperature of the corner regions of the panel on the occasion of drying the coated film of the pigment dispersion liquid, the generation of dot flaws was not recognized at all. It will be seen from these results that it is possible, through the provision of drying means which is exclusively assigned to dry the corner portions of the coated film, to prevent the generation of dot flaws irrespective of the temperature of the corner regions of the panel, thereby making it possible to obtain an excellent fluorescent screen which is stable in quality.

As explained above, it was possible, through the provision of a drying means which was exclusively assigned to dry the corner portions of the coated film, to uniformly dry a coated film of pigment dispersion liquid which had been deposited on the inner surface of panel, and hence to prevent the generation of a boundary between the dried region and the undried region in the coated film. As a result, it was possible to prevent the generation of rib-like thickened film portion, and hence the generation of linear dot flaws.

Next, investigations were performed on the quality of fluorescent screens which had been dried by means of the aforementioned exclusive drying means under the conditions where the transmittance (film thickness) of the pigment layer was changed within the range of 10 to 95% at various temperatures of the corner regions of panel. The results are shown in FIG. 3, wherein the quality of fluorescent screen was assessed under the criterion that when the quality grade was 8 or more, the fluorescent screen was deemed to be non-defective, while when the quality grade was 7 or less, the fluorescent screen was deemed to be defective.

Figure 3:
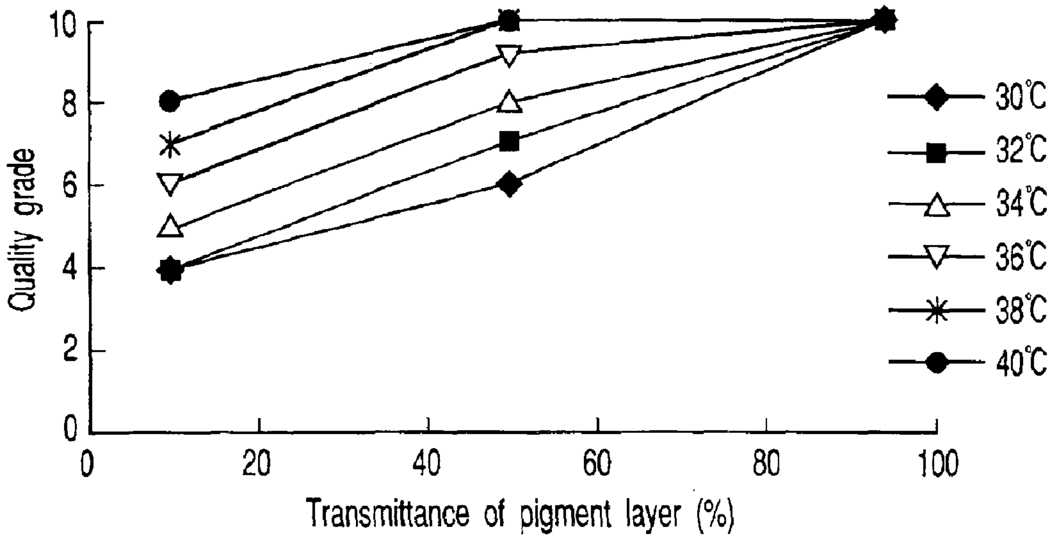
FIG. 3 is a graph illustrating the relationship between the light transmittance (film thickness) of a pigment and the quality of fluorescent screen, which were obtained at various temperatures of the corner regions under the condition where the corner portions were dried by making use of a drying means which was exclusively assigned to the corner portions.

It will be seen from FIG. 3 that even if the temperature of the corner regions was relatively low, it was possible to obtain a fluorescent screen of high quality. It will be also seen from FIG. 3 that the higher (80% or more) the transmittance of the pigment layer (the thinner the pigment layer) was, the more excellent was the quality of product.

Although above examples were directed to embodiments where the present invention was applied to the manufacture of the color filter to be employed in a color cathode-ray tube, the present invention is not limited to the cathode-ray tube but can be applied also to the color filter to be employed in various kinds of display apparatus such as a plasma display panel (PDP) or a liquid crystal display device.

As explained above, since it is possible, according to the present invention, to control the drying speed at the central region and corner regions of glass panel on the occasion of drying a film such as a color filter having an excellent light transmission, the entire surface of the film can be uniformly dried, thereby making it possible to prevent the generation of a boundary between the dried region and the undried region, and to prevent the generation of rib-like irregular film thickness or of non-uniform thickness of pigment layer. As a result, it is now possible to obtain a fluorescent screen which is excellent in uniformity in brightness and in external appearance.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of forming a fluorescent screen where a color filter film and a fluorescent film are deposited on a surface of a light transmissive substrate, said method comprising:

coating a pigment dispersion liquid on the surface of the light transmissive substrate to form a coated film, an average particle diameter of the pigment in said pigment dispersion liquid being confined to 0.2 μm or less; and forming a color filter film by drying the coated film;

wherein drying of the coated film is performed under conditions that a temperature of corner portions of said light transmissive substrate is controlled to 36 °C. to 50° C., a difference in temperature between a temperature of a central region and the temperature of the corner portions of said light transmissive substrate is confined to within 7° C., and a film thickness of said color filter film is controlled to 0.3 μm or more.

2. The method according to claim 1, wherein an average particle diameter of the pigment in said pigment dispersion liquid is confined to the range of 0.01 μm to 0.2 μm.

3. The method according to claim 1, wherein said pigment dispersion liquid is a color filter which permits a light of the same color as the luminescent color of the fluorescent film to pass therethrough.

4. The method according to claim 1, wherein said fluorescent screen is one which is designed to be formed on an inner surface of the panel of a color cathode-ray tube.

5. The method according to claim 1, wherein the coating of said pigment dispersion liquid on a surface of said light transmissive substrate is performed by means of a rotational coating method.

6. The method according to claim 1, wherein said color filter film permits a light of the same color as the luminescent color of the fluorescent film to pass therethrough.

7. A method of forming a fluorescent screen where a color filter film and a fluorescent film are deposited on a surface of a light transmissive substrate, said method comprising:

coating a pigment dispersion liquid on a surface of the light transmissive substrate to form a coated film, an average particle diameter of the pigment in said pigment dispersion liquid being confined to 0.2 μm or less; and forming a color filter film by drying the coated film;

wherein drying of the coated film is performed such that corner portions of the coated film are allowed to dry by a drying means which is exclusively assigned to dry the corner portions of the coated film in addition to separate drying means which is assigned to dry the entire surface of the coated film, the temperature of corner portions of said light transmissive substrate is controlled to the range of 36 °C. to 50 °C., and a film thickness of said color filter film is controlled to 0.3 μm or more.

8. The method according to claim 7, wherein said drying means which is exclusively assigned to dry the corner portions of the coated film is air-blowing means.

9. The method according to claim 7, wherein an average particle diameter of the pigment in said pigment dispersion liquid is confined to the range of 0.01 μm to 0.2 μm.

10. The method according to claim 7, wherein said pigment dispersion liquid is a color filter which permits a light of the same color as the luminescent color of the fluorescent film to pass therethrough.

11. The method according to claim 7, wherein said fluorescent screen is one which is designed to be formed on an inner surface of the panel of a color cathode-ray tube.

12. The method according to claim 7, wherein the coating of said pigment dispersion liquid on a surface of said light transmissive substrate is performed by means of a rotational coating method.

13. The method according to claim 7, wherein said color filter film permits a light of the same color as the luminescent color of the fluorescent film to pass therethrough.

* * * * *